United States Patent [19]
Moser

[11] Patent Number: 5,460,675
[45] Date of Patent: Oct. 24, 1995

[54] METHOD OF FORMING REUSABLE SEAMLESS MANDRELS FOR THE FABRICATION OF HOLLOW FIBER WOUND VESSELS

[75] Inventor: Daniel Moser, Magna, Utah

[73] Assignee: Edo Corporation, Fiber Science Division, Salt Lake City, Utah

[21] Appl. No.: 193,427

[22] Filed: Feb. 8, 1994

Related U.S. Application Data

[63] Continuation of Ser. No. 909,045, Jul. 6, 1992, abandoned.

[51] Int. Cl.⁶ .......................... B65H 81/00; B65H 81/02
[52] U.S. Cl. .................. 156/155; 156/169; 156/173; 156/175; 264/314
[58] Field of Search ........................... 156/173, 175, 156/169, 166, 155; 264/314

[56] References Cited

U.S. PATENT DOCUMENTS

| | | |
|---|---|---|
| 3,220,910 | 11/1965 | Walkey . |
| 4,525,228 | 6/1985 | Bowen . |
| 4,684,423 | 8/1987 | Brooks . |
| 4,797,685 | 1/1989 | Guler et al. . |
| 4,921,557 | 5/1990 | Nakamura . |
| 5,057,174 | 10/1991 | Anderson et al. . |
| 5,259,901 | 11/1993 | Davis ........................ 156/154 |

OTHER PUBLICATIONS

Lubin, George, *Handbook of Composites,* Van Nostrand Reinhold Company, Inc., 1982, pp. 461–462.
"Filament Winding: its development, manufacture, applications, and design" by Rosato, et al., 1964.

*Primary Examiner*—Jeff H. Aftergut
*Attorney, Agent, or Firm*—Thorpe, North & Western

[57] ABSTRACT

A method for fabricating, and a resulting structure for, a seamless, reusable and collapsible mandrel suitable for forming a plurality of seamless and hollow fiber wound vessels upon is disclosed. A destructible mandrel is used to form the seamless reusable mandrel. The destructible mandrel is preferably formed from a material which can be destroyed by dissolving, for example, materials such as foam or plaster. The seamless, collapsible, and reusable mandrel includes a plurality of different layers including a gas impermeable layer, a continuous fiber wound layer, and a release surface forming the outermost layer of the seamless, collapsible, and reusable mandrel. The resulting seamless, reusable and collapsible mandrel has advantages over mandrels which include a seam. Such advantages include a longer useful life and consistently high quality fiber wound vessels at a relatively low cost.

10 Claims, 2 Drawing Sheets

METHOD OF FORMING REUSABLE SEAMLESS MANDRELS FOR THE FABRICATION OF HOLLOW FIBER WOUND VESSELS

This application is a continuation of application Ser. No. 07/909,045 filed Jul. 6, 1992, now abandoned.

BACKGROUND

1. The Field of the Invention

The present invention relates to mandrels used for fabricating hollow continuous filament wound vessels and tanks and methods of constructing such mandrels.

2. The Prior Art

Methods of constructing filament wound vessels, tanks, and containers are well known in the prior art. Typically, a rigid mandrel made of aluminum, fiberglass, or other high strength and relatively lightweight material, or the like is prepared and mounted on a filament winding machine so that the mandrel may be selectively rotated. The surface of the mandrel is coated with an appropriate mold release preparation and then wound with resin impregnated or coated filaments, such as glass, KEVLAR®, graphite, nylon or boron fibers. Commonly, the winding progresses from end to end for an elongated shape or from side to side for a more spherical shape. When the desired thickness of the winding layers is achieved, the winding is stopped and the resin is cured.

In many cases, the resulting filament wound vessel is removed from the mandrel by cutting the vessel about its circumference, generally at a location near the center thereof. The two halves of the vessel are then removed from the mandrel and the halves joined and bonded together to form the desired vessel or tank. A short helical wind of a resin coated filament strand or roving may be made over the joint of the vessel in an attempt to further secure the two halves together.

Examples of prior art winding techniques and methods are disclosed in U.S. Pat. Nos. 3,386,872, 3,412,891, 3,697,352, 3,692,601, 3,533,869, 3,502,529 and 3,414,449.

Because of the joint in the completed vessel, an inherent weakness exists which may be the first to fail or fracture when the completed vessel is subjected to pressure or stress. Because of the weakness in the resulting vessel and the added labor costs associated with cutting the vessel and rejoining the two halves of the vessel, techniques have been developed which allow the fabrication of hollow vessels without the need to cut the vessel to remove it from the mandrel.

In some cases, for example, a hollow mandrel is designed to become an integral part of the completed fiber wound vessel. Disadvantageously, the intended use of the completed fiber wound vessel is often not compatible with retaining the mandrel as the interior of the vessel. Another technique involves using a mandrel which is destroyed once the vessel is formed. It will be appreciated that if a large number of a particular configuration of fiber wound vessel are to be fabricated, destroying the mandrel with each use is an exorbitantly expensive technique. Thus, reusable mandrels have been developed.

In some cases, segmented metal mandrels, which can be disassembled into small sections and then removed through an opening in the completed vessel, have been used. Disadvantageously, building a reusable metal mandrel is costly and time consuming. The difficulty of building a reusable segmented metal mandrel makes it too expensive for all but the most demanding applications of high volume vessel fabrication.

Another type of mandrel which has been used to produce seamless completed fiber wound vessels is a collapsible mandrel. Collapsible mandrels are hollow mandrels made of flexible, air tight materials such as a rubber which can be inflated while the vessel is being formed thereon and then deflated and removed through an opening in the completed vessel.

One collapsible mandrel which can be removed through an opening in a completed vessel is disclosed in U.S. Pat. No. 4,684,423 to Brooks. While the method of forming the mandrel and, the resulting mandrel structure, which are disclosed in the Brooks reference represented a great advance in the art, several disadvantages still remain. The Brooks reference requires that the resulting mandrel be cut in half to remove it from a rigid mandrel. Cutting and splicing the mandrel structure results in an inherently weaker and less desirable mandrel. Since the area at the resulting joint is weaker than the remaining structure, the joint often fails sooner than the other portions of the structure. Thus, the usable life of the mandrel is often unduly limited because of the presence of the joint.

Further drawbacks and disadvantages inherent in the structure and method disclosed in the Brooks reference include the additional labor which is required to cut and rejoin the mandrel. Moreover, since the outside surface of the mandrel determines the shape and uniformity of the interior surface of the completed fiber wound structure, a poorly formed seam in the collapsible mandrel can result in an inconsistent surface in the completed fiber wound hollow structure. Even though the use of collapsible mandrels to form seamless completed structures is known, for example as in the Brooks reference, the problems inherent in a mandrel which has been cut and spliced together has not been addressed in the art.

In view of the forgoing, it would be an advance in the art to provide a seamless, collapsible, and reusable mandrel structure and an accompanying method of forming the same.

BRIEF SUMMARY AND OBJECTS OF THE INVENTION

In view of the above described state of the art, the present invention seeks to realize the following objects and advantages.

It is a primary object of the present invention to provide a collapsible mandrel which is suitable for use in the fabrication of filament wound vessels and which is seamless, as well as, an accompanying method of making the same.

It is also an object of the present invention to produce an improved collapsible mandrel which is suitable for use in the fabrication of filament wound vessels which maintains its proper shape as the vessel is fabricated upon it, as well as, an accompanying method of making the same.

It is also an object of the present invention to provide an improved collapsible and reusable mandrel upon which high quality filament wound vessels can be consistently produced.

It is another object of the present invention to provide a collapsible and reusable mandrel which has a long useful life and which can be fabricated at a relatively low cost.

These and other objects and advantages of the invention will become more fully apparent from the description and claims which follow, or may be learned by the practice of the invention.

The present invention provides a method for fabricating, and a resulting structure for, a seamless, reusable and collapsible mandrel suitable for forming a plurality of seamless and hollow fiber wound vessels upon. The method of fabricating the seamless reusable mandrel includes readying a destructible mandrel upon which the seamless reusable mandrel is formed. The destructible mandrel is the general shape of the seamless mandrel and is preferably formed from a material which can be destroyed by dissolving the material, for example, materials such as foam or plaster.

The structure of the seamless, collapsible, and reusable mandrel of the present invention includes a plurality of different layers, each layer having a particular function. Different embodiments of the present invention require different numbers of layers in the seamless, collapsible, and reusable mandrel. Exemplary of the layers which are laid upon the destructible mandrel to fabricate the seamless, collapsible, and reusable mandrel of the present invention include: a first layer of generally fluid impermeable material; a second layer of continuous fibers wound about the destructible mandrel; and a layer which functions as a release surface forming the outermost layer of the seamless, collapsible, and reusable mandrel of the present invention. The release surface is formed in the shape of the interior of the completed seamless and hollow fiber wound vessel which will be formed on the seamless, collapsible, and reusable mandrel. The outer surface of the seamless, collapsible, and reusable mandrel is preferably machined so that it exactly matches the desired shape of the interior of a completed fiber wound hollow vessel to be formed thereon.

The destructible mandrel is removed from the interior of the seamless, reusable and collapsible mandrel preferably by dissolving the material from which the destructible mandrel is formed. Thus, the integrity of the seamless, collapsible, and reusable mandrel is not disturbed by a seam. Previously available mandrels, which needed to be cut in half and spliced back together to remove them from the rigid mandrel upon which they were formed, are inherently weaker and less desirable than the seamless mandrels produced by the present invention.

The seamless, reusable and collapsible mandrel of the present invention includes at least means for conducting a gas under pressure to the interior of the mandrel and a fluid impermeable layer capable of retaining a gas within the interior of the mandrel. Also included is a fiber reinforcement layer capable of limiting the expansion of the mandrel when pressurized gas is introduced therein such that as the pressure inside the mandrel is increased and the material forming the vessel is added to the outer surface of the reusable and collapsible mandrel, the mandrel maintains its desired shape. The fiber reinforcement layer is formed using continuous fiber winding techniques. Also included is an outer release surface. The outer release surface receives the materials of the seamless and fiber wound hollow vessel formed thereon. The seamless, reusable and collapsible mandrel of the present invention can be reused many times and consistently produces high quality fiber wound vessels at a relatively low cost.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

It will be appreciated that as the number and kinds of applications for filament wound hollow vessels increases, the demand for easily fabricated, precision mandrels has also increased. The present invention provides the benefits of low cost which accompany the use of seamed inflatable mandrels as well as the added benefits of precision and long life which, prior to the present invention, only accompanied the use of segmented metal mandrels.

Figure 1:
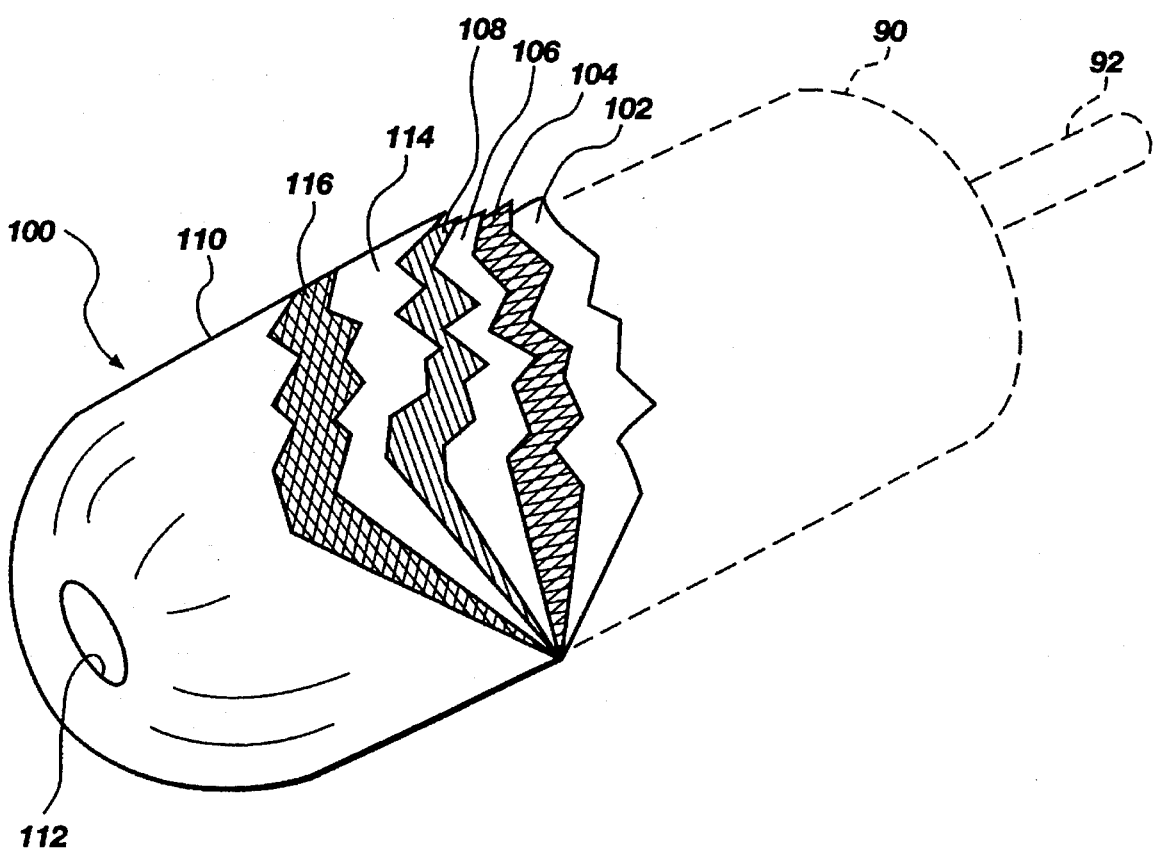
FIG. 1 is a partially cut away perspective view of the presently preferred embodiment of the completed seamless, collapsible, and reusable mandrel of the present invention.

Reference will now be made to the presently preferred seamless, collapsible, and reusable mandrel generally represented at 100 shown in a partially cut away perspective view in FIG. 1. The seamless, collapsible, and reusable mandrel 100 represented in FIG. 1 is fabricated using known materials and techniques in conjunction with inventive teachings set forth herein. Those skilled in the pertinent arts will readily recognize the materials and techniques described herein are also of the general type and class referred to in U.S. Pat. No. 4,684,423 to Brooks which is now incorporated herein by reference.

FIG. 1 represents the various structural layers of the seamless, collapsible, and reusable mandrel 100 of the present invention. While the mandrel 100 illustrated in FIG. 1 is of a cylindrical shape, the mandrels of the present invention can be fabricated into any number of shapes needed to form hollow vessels.

The steps set forth below are presently preferred for fabricating the seamless, collapsible, and reusable mandrel 100 illustrated in FIG. 1.

A non-reusable mandrel 90 is first fabricated, on a shaft 92, upon which the seamless, collapsible, and reusable mandrel 100 will be fabricated. The non-reusable mandrel 90 is only partially represented in phantom image in FIG. 1 to show its relationship to the seamless, collapsible, and reusable mandrel 100. The shape of the non-reusable mandrel will determine the shape of the seamless, collapsible, and reusable mandrel 100. Utilization of a non-reusable mandrel is essential to the present invention in order to fabricate the resulting reusable collapsible mandrel 100 as a seamless mandrel. Such a non-reusable mandrel must be destroyed during use in order to remove the resulting seamless mandrel. Thus, such a mandrel is also referred to herein as a destructible mandrel.

The non-reusable mandrel 90 can be formed from many different materials and procedures; those skilled in the art will realize that the herein described materials and procedures are merely preferred and that other materials and procedures can also be used. The important criteria is that the resulting mandrel 90 must be readily destructible in order to remove it from the small polar opening, 112 in FIG. 1, which remains in the seamless, collapsible, and reusable mandrel 100.

To form the mandrel 90, it is preferred that a foam block be set up on a shaft 92 and formed using a turning mechanism. The foam block should be formed to slightly smaller than a shape which conforms to the finished shape of the non-reusable mandrel 90.

A screeding template is formed which conforms exactly to the finished shape and size of the non-reusable master mandrel 90. The screeding template is set to the proper orientation on the turning mechanism. A mixture consisting of 80% plaster and 20% milled glass fibers (1/32 inch to 1/4 inch) is prepared. The plaster is preferably one which is readily dissolved or destroyed such as that available under the trademark EASY OUT.

While the foam block is rotated on the shaft turning mechanism, glass cloth strips (7500 style or equivalent) and plaster is laid on the foam block. After a first layer of glass cloth strips and plaster has dried, a further layer(s) of glass cloth strips and plaster is added until the surface is about 1/4 inch from the surface of the screed. After the previous layers of cloth and plaster have hardened a final layer of only plaster is added using the screeding template to form the surface to the exact shape and size desired. The non-reusable mandrel 90 is then allowed to dry for 24 hours.

After the non-reusable mandrel 90 is dried, it is preferably cured at 300° F. to 600° F. for two hours for each inch thickness of plaster mixture added to the surface of the foam block. Upon completion of the cure time, the non-reusable mandrel 90 should be cooled at a rate not exceeding 5° F. per minute. The non-reusable mandrel 90 should then be inspected and any rough areas smoothed with a fine grit sand paper as required. The surface of the non-reusable mandrel 90 is then sealing with any appropriate resin, tape, or soluble liquid sealant which will provide a suitable release surface for the non-reusable mandrel 90.

The completed non-reusable mandrel 90 is mounted on a 3-axis winding machine having a fiber delivery system as is known in the art. With the surface of the non-reusable master mandrel prepared with a release material, an inner rubber layer 102 of uncured rubber is applied using methyl-ethylketone (MEK) sparingly as a tackifier. The sheet of rubber should be trimmed so that the sheets overlap by at least 1/8 inch. The rubber sheets will need to be trimmed so that the rubber lies evenly on the contours of the non-reusable master mandrel.

A dispersion solution is prepared and used next. The dispersion solution preferably comprises small bits of nitrile sheet which have been soaked in MEK for at least 1 hour with mixing until the bits are well dissolved and the solution is the consistency of paint. This dispersion solution will be used for encapsulating the Kevlar fiber during winding. The dispersion solution should be agitated and thinned with MEK as needed to avoid clumping.

The winding machine should be programmed to the required specifications as is known in the art. As is known in the art, the lowest angle helical is normally wound first to create helical fiber plies as represented at fiber wound layer 104 in FIG. 1. The resulting fiber band should be in a "space wind" configuration with a minimum of 1/8" spacing between tows.

After the first helical winding is completed, the nitrile/MEK solution should be allowed to outgas at room temperature for at least 20 minutes. The winding machine can be used to apply winding angles in addition to the first helical winding to further complete the helical fiber plies comprising the fiber reinforced layer 104. Care should be exercised to avoid bridging the rubber layers between the fibers in order to achieve a strong rubber-to-rubber bond. In the case of small, seamless, collapsible, and reusable mandrels, both a hoop and helical ply may be needed together at this point for the helical fiber plies 104 to have the desired characteristics. Next, if desired, the winding machine can be programmed to wind another helical layer.

After the helical plies have been completed to form the fiber reinforced layer 104, a first middle rubber layer 106 of uncured rubber is applied in a manner the same as or similar to that described for the inner rubber layer 102. As indicated earlier, the rubber sheets should be trimmed so that the sheets overlap so that the rubber lies evenly on the contours of the non-reusable mandrel 90.

The winding machine should next be programmed to the hoop winding program to form another fiber reinforced layer 108, this time using a hoop fiber ply as represented in FIG. 1 and as indicated earlier. The hoop fiber ply, forming another fiber reinforced layer 108 is wound from tangent to tangent and, upon completion, the nitrile/MEK solution should again be allowed to outgas at room temperature for at least 20 minutes.

Next, a second middle layer of rubber 114 is laid on as described earlier followed by the winding machine being programmed and executing a high angle helical wind forming a second fiber reinforced layer 116. Following the completion of the winding, the structure is outgassing at room temperature for at least 20 minutes. If desired, additional fiber reinforced layers (e.g., hoop or tangent windings) and rubber layers can be added to the mandrel 100 of the present invention followed by the outgassing steps.

Next, the outer rubber layer 110 is applied as indicated in the earlier described steps. If desired, extra sheets of rubber can be applied to the outer rubber layer 110 to serve as a sacrificial machining layer. The surface of the outer rubber layer 110 will function as a release surface in the shape of the interior of the completed fiber wound hollow vessel. If needed, material such as glass cloth strips (7500 style or equivalent) can be used to reinforce the outer rubber layer 110 as required to achieve added strength and/or rigidity.

The entire seamless, collapsible, and reusable mandrel is next wrapped in perforated TEDLAR® release film. The seamless, collapsible, and reusable mandrel is then preferably enveloped in a nylon vacuum bag equipped with an N-10 breather as is known in the art. Importantly, it should be assured that the interior of the seamless, collapsible, and reusable mandrel is evacuated. The greatest vacuum available should be applied to the seamless, collapsible, and reusable mandrel at room temperature for best results. Checks should be made to detect any leaks.

Next, the bagged seamless, collapsible, and reusable mandrel is cured at 350° F. for 2 hours (minimum) or cured in accordance with the rubber manufacturer's recommendations. A lower temperature hold is permissible, if desired. Preferably, an autoclave (capable of pressures of at least 30 p.s.i.g.) should be used but internal pressure or thermal compaction techniques, as known in the art, may also be employed.

After the cure time is complete, the seamless, collapsible, and reusable mandrel is allowed to cool down slowly and the bagging material is removed. After the bagging material is removed, the seamless, collapsible, and reusable mandrel should be trimmed in the appropriate areas. The non-reusable mandrel 90 should then be removed. Preferably, the non-reusable mandrel 90 is removed by destroying it and removing the resulting slurry and/or pieces through the small polar opening 112. An ultrasonic knife or very sharp trimming tools should be used to cut Kevlar.

After the seamless, collapsible, and reusable mandrel 100 is free from the non-reusable mandrel 90 and finished, it should be mounted onto a winding shaft with all of its associated hardware (see FIG. 2) to verify that the seamless, collapsible, and reusable mandrel 100 is concentric to the shaft with very little runout (preferably less than 0.020 inch). A leak check at 2 p.s.i. minimum should also be performed.

The outside of the seamless, collapsible, and reusable mandrel should be machined as necessary to contour the outer rubber surface. In preparation for fabricating a fiber wound filament vessel on the seamless, collapsible, and reusable mandrel, a 1–2 mil thick FEP release layer (as known in the art) can be sprayed onto the outer rubber layer 110, if required. Further inspection of the mandrel 100 using templates, ☞ tape, and dial indicators should be performed to ensure consistent quality.

Figure 2:
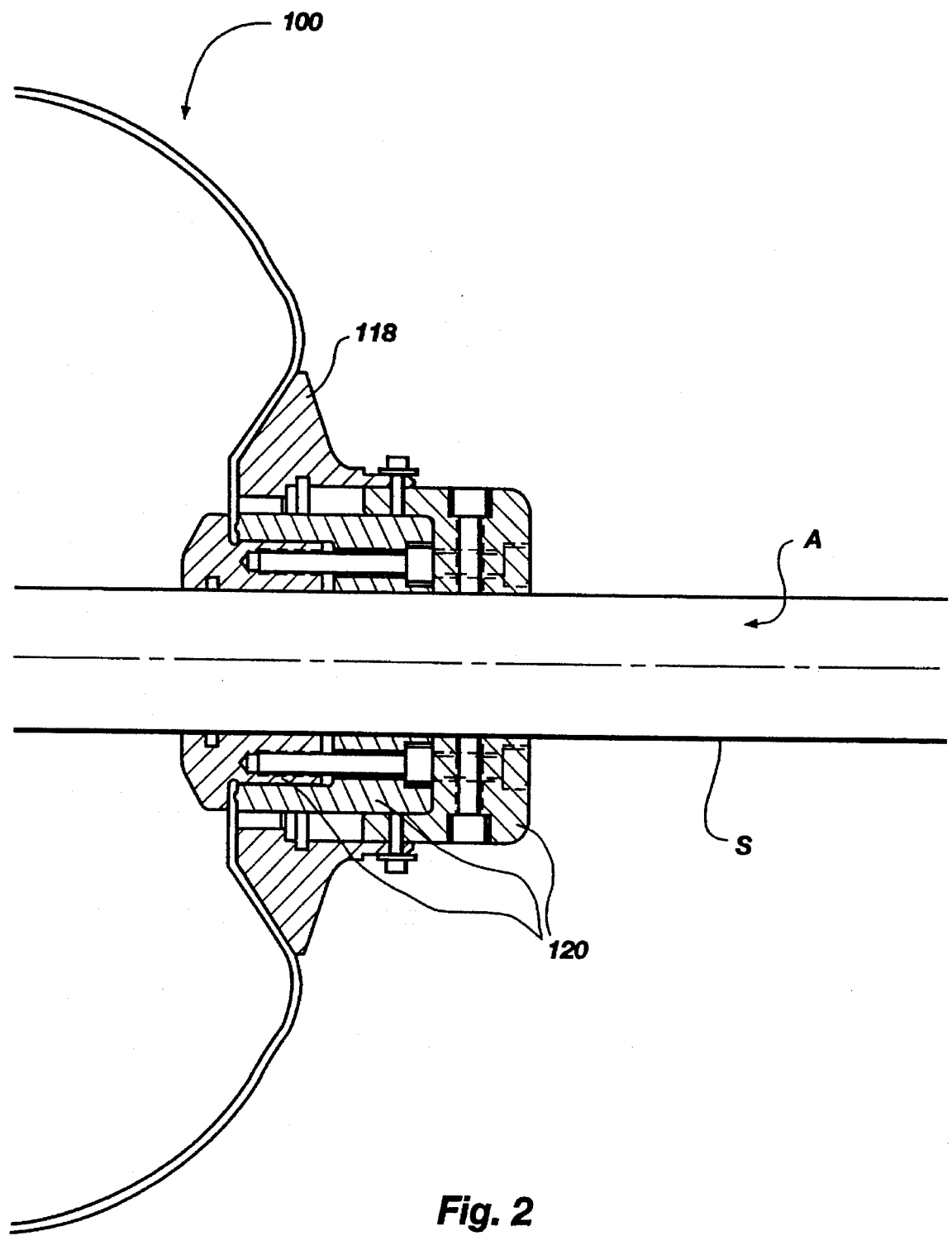
FIG. 2 is a cross sectional view of the mandrel of the present invention as it appears when mounted on a winding machine shaft ready to receive the filament windings.

FIG. 2 is a diagrammatic cross sectional view of the seamless, collapsible, and reusable mandrel 100 mounted on a hollow winding shaft S commonly found in a winding machine (not shown) as known in the art. The winding shaft includes a passageway A which conducts a gas under pressure to the interior of the seamless, collapsible, and reusable mandrel 100.

The seamless, collapsible, and reusable mandrel 100 is held in place on the winding shaft S by a polar boss 118, which will become part of the completed fiber wound hollow vessel (not shown), and various pieces of hardware 120 which retain the polar boss 118 and grasp the winding shaft S. Such structures can be those which are known in the art.

With the seamless, collapsible, and reusable mandrel 100 mounted on the winding shaft S, the fiber wound hollow vessel is formed thereon. As more material is added to the mandrel 100, the pressure within the seamless, collapsible, and reusable mandrel 100 is adjusted to maintain the proper shape of the mandrel 100. When the fiber wound hollow vessel (not represented) is completed, the mandrel 100 is deflated and the hardware 120 removed, and the mandrel 100 removed through the end opening of the completed fiber wound hollow vessel (not shown).

Since the mandrel 100 is seamless, it is inherently stronger than a corresponding mandrel which was cut and spliced while being formed. Thus, the mandrel 100 is reusable many times more than similar mandrels having a seam. Moreover, the represented seamless mandrel 100 is capable of producing more uniform completed fiber wound hollow vessels.

It will be appreciated that the present invention provides a collapsible mandrel which is suitable for use in the fabrication of various filament wound hollow vessels and which is seamless. The present invention also produces an inflatable mandrel which maintains its proper shape as a hollow vessel is fabricated upon it as well as being reusable to consistently fabricate high quality filament wound hollow vessels and which is relatively low cost.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of fabricating a seamless, reusable and collapsible mandrel suitable for forming a plurality of seamless and hollow fiber wound vessels upon and forming such seamless and hollow fiber wound vessels upon said mandrel, the method comprising the steps of:

readying a destructible mandrel, the destructible mandrel being at least somewhat the general shape of a desired seamless and hollow fiber wound vessel to be produced using the resulting seamless, reusable and collapsible mandrel the step of readying a destructible mandrel comprising the steps of:
 forming a foam block, the foam block being formed in a shape at least slightly smaller than a desired shape of the seamless, reusable and collapsible mandrel;
 forming a screedable layer over the foam block, the screedable layer conforming to the finished shape and size of the seamless, reusable and collapsible mandrel;

applying a layer of generally gas impermeable material about the destructible mandrel to form a first layer of the seamless, reusable and collapsible mandrel;

winding a layer of at least one fiber about the destructible mandrel to form a second layer of the seamless, reusable, and collapsible mandrel, the second layer functioning as a reinforcement layer;

forming a release surface on the exterior of the outermost layer, the release surface being formed in the shape of the interior of the desired seamless and hollow fiber wound vessel and the outermost layer being suitable for winding a fiber wound vessel upon such that the reinforcement layer limits the expansion of the seamless, reusable and collapsible mandrel when pressurized gas is introduced therein such that the pressure inside the mandrel is increased as the material forming the vessel is added to the seamless, reusable, and collapsible mandrel and such that the mandrel maintains its shape as the seamless and hollow fiber wound vessel is formed thereon;

removing the destructible mandrel from the interior of the seamless, reusable and collapsible mandrel such that no structures remain within the interior of the seamless, reusable and collapsible mandrel which interconnect portions of an interior wall of the mandrel while not disrupting the integrity of the removable mandrel nor forming any seams therein; and forming a plurality of seamless and hollow fiber wound vessels upon seamless, reusable and collapsible mandrel.

2. A method of fabricating a seamless, reusable and collapsible mandrel as defined in claim 1 wherein the step of readying a destructible mandrel comprises the step of forming a plaster mandrel.

3. A method of fabricating a seamless, reusable and collapsible mandrel as defined in claim 2 wherein the step of readying a destructible mandrel further comprises the step of screeding the surface of the plaster mandrel.

4. A method of fabricating a seamless, reusable and collapsible mandrel as defined in claim 1 wherein the step of readying a destructible mandrel comprises the step of forming a mandrel having a foam core.

5. A method of fabricating a seamless, reusable and collapsible mandrel as defined in claim 1 wherein the step of removing the removable destructible mandrel from the interior of the seamless, reusable and collapsible mandrel comprises the step of dissolving the destructible mandrel.

6. A method of fabricating a seamless, reusable and collapsible mandrel as defined in claim 1 further comprising the step of treating the release surface with a release agent.

7. A method of fabricating a seamless, reusable and collapsible mandrel as defined in claim 1 further comprising the steps of:

applying another layer of generally gas impermeable material about the destructible mandrel; and winding another layer of at least one continuous fiber about the destructible mandrel.

8. A method of fabricating a seamless, reusable and collapsible mandrel as defined in claim 1 further comprising the step of curing the seamless, reusable and collapsible mandrel.

9. A method of fabricating a seamless, reusable and collapsible mandrel as defined in claim 1 wherein the step of forming a screedable layer comprises the steps of:

forming a layer of plaster and cut fibers over the foam block;

forming a layer of plaster over the layer of plaster and cut fibers; and screeding the layer of plaster to the shape and size of the seamless, reusable and collapsible mandrel.

10. A method of fabricating a seamless, reusable and collapsible mandrel as defined in claim 9 further comprising the step of sealing the surface of the layer of plaster to provide a release surface.

* * * * *